G. D. POGUE.
MAXIMUM DEMAND RECORDER.
APPLICATION FILED NOV. 20, 1917.
1,279,378.
Patented Sept. 17, 1918.
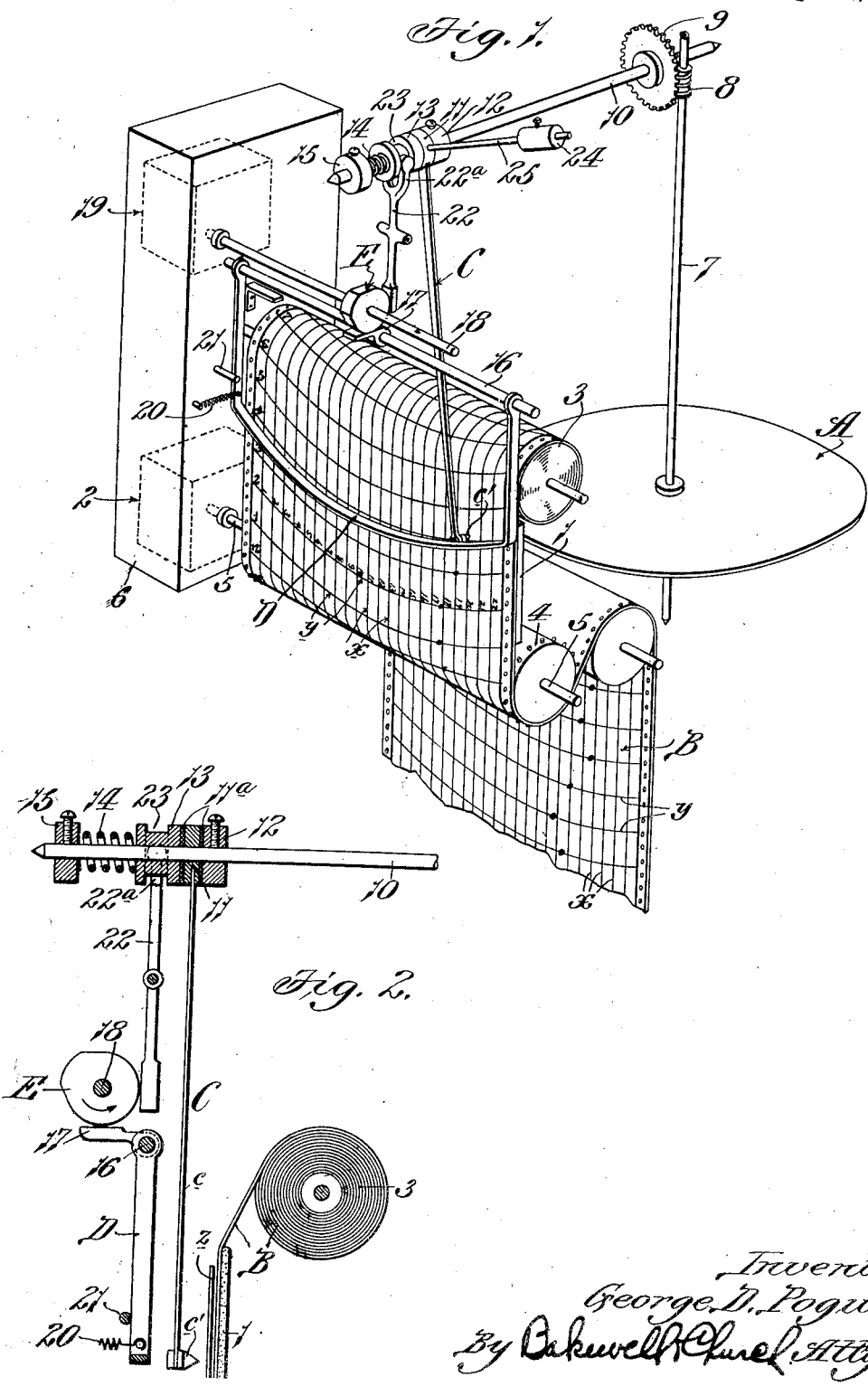
Inventor,
George D. Pogue.
By Bakewell & Cornwell, Attys.

UNITED STATES PATENT OFFICE.

GEORGE D. POGUE, OF ST. LOUIS, MISSOURI.

MAXIMUM-DEMAND RECORDER.

1,279,378.  Specification of Letters Patent.  Patented Sept. 17, 1918.

Application filed November 20, 1917. Serial No. 202,906.

*To all whom it may concern:*

Be it known that I, GEORGE D. POGUE, a citizen of the United States, residing at St. Louis, Missouri, have invented a certain new and useful Improvement in Maximum-Demand Recorders, of which the following is a full, clear, and exact description, such as will enable others skilled in the art to which it appertains to make and use the same.

This invention relates to maximum demand recorders of the kind that are used in connection with watt-hour meters and other forms of metering instruments for making a graphic record of the maximum amount of electric current or medium passed through the meter or instrument with which the recorder is used during any one of a number of fixed periods of time, commonly referred to as "demand intervals."

The interval maximum demand recorders that are now generally used in connection with watt-hour meters for recording each of a series of separate, integrated or averaged interval demands comprise a traveling chart and a movable stylus or printing device combined in such a manner that they produce a graphic record made up of a continuous irregular line that represents a series of separate, integrated or averaged interval demands and the time of the day and the day of the week or month at which the interval demands were made. The stylus or printing device which is set at zero when the recorder is first put in operation is operated either directly by the watt-hour meter or by an electrically-actuated means governed by the meter, and at the end of a predetermined time interval, for instance, a fifteen minute interval, the stylus is restored to zero position, the distance which the stylus travels over the chart up to the instant at which it is restored to zero being proportional to the number of kilowatt hours that have passed through the watt-hour meter during that particular time interval. In one type of interval maximum demand recorder the chart is driven continuously at a fixed rate per hour by a clock mechanism that forms part of the recorder, and the stylus or printing device remains constantly in direct contact with the chart, thus producing a record that is "saw-toothed" in form, the highest "peak" recorded during a month or any other preferred fiscal period representing the maximum interval demand occurring during the whole series of separate, non-lapping time intervals. In the other type of interval maximum demand recorder now in general use the stylus or printing device also remains in direct contact with the chart at all times but the chart is advanced intermittently or step by step, thus producing a record in which the lines drawn by the stylus or printing device are parallel to each other, the length of each line being proportionate to the amount of energy passed through the meter during that particular demand interval. Recorders of the type in which the stylus is operated directly by the meter, or, in other words, is mechanically connected to some moving element of the meter, are objectionable, in that the load imposed upon the watt-hour meter, in moving the stylus over the chart, impairs the accuracy of the meter to a greater or lesser extent. While this is not true of recorders of the type in which the stylus is operated by an electrically-actuated means governed by the watt-hour meter, the electric contacts of recorders of the type last referred to are subject to corrosion or welding, which may seriously impair the action of the recorder or even the watt-hour meter itself. Another objectionable feature common to both of the types of interval maximum demand recorders now in general use is that the record on the chart is made with ink which is mussy to handle. Furthermore, considerable care and attention are required to keep the stylus or pen in operative condition, it being necessary to send an attendant to the recorder about once a week to clean the stylus and to replenish the supply of ink, and even more frequently in the electrically-operated type to insure that the electric contacts are in working order. It is not practicable to equip the stylus with a large ink reservoir, due to the fact that the weight of a large ink reservoir would impose too great a load on the watt-hour meter when the stylus is driven directly by the meter.

One object of my invention is to provide an interval maximum demand recorder of simple construction, that does not frequently require the services of an attendant to keep it in operative condition.

Another object is to provide an interval maximum demand recorder which is so constructed that it will not impose a load on the watt-hour meter or metering instrument with which it is used great enough to cause the accuracy of said meter or instrument to be impaired.

And still another object is to provide an interval maximum demand recorder which is so constructed that an impression device, marking device or perforating device can be used either alone or in combination with an inked ribbon or carbon paper to make a graphic record on a chart.

To this end I have devised an interval maximum demand recorder that comprises a chart, a recording device that is normally out of contact with the chart and which is combined with the watt-hour meter or other metering instrument with which the recorder is used in such a manner that it moves over the chart a distance proportional to the total movement of the measuring element of the meter or instrument during a demand interval or interval of fixed duration, and means whereby at the termination of each demand interval said recording device and chart will be brought into engagement with each other so as to cause a mark, perforation or impresson to be made on the chart, thereby producing a record made up of a series of dots, marks or perforations that show the amount of current or medium passed through the meter or metering instrument during each successive demand interval, it being easily possible at the end of a month or any other suitable fiscal period to determine the amount and time of occurrence of the maximum demand. The recording device may consist of an impression device, a perforating device or a printing device, and the chart can either be stationary or it can be moved either continuously at a fixed rate per hour or intermittently with a step by step movement. The recording device can either be operated directly by the watt-hour meter, or metering instrument with which the recorder is used, or it can be operated by another means controlled by said watt-hour meter or metering instrument. While not practicable to do so, on account of the relatively greater weight of the chart and operating mechanism, it would, of course, be possible to move the chart relatively to a stationary recording device. The mark, impression or perforation on the chart can be made either by moving the recording device into engagement with the chart, or moving the chart into engagement with the recording device. I have herein illustrated my invention embodied in an interval maximum demand recorder that is intended to be used with a watt-hour meter, but I wish it to be understood that my broad idea is not limited to a recorder of the particular construction or type herein illustrated or to an interval maximum demand recorder designed for use with a watt-hour meter.

Figure 1 of the drawings is a perspective view, illustrating an interval maximum demand recorder constructed in accordance with my invention; and Fig. 2 is a detail view, partly in section, illustrating certain parts of the recorder shown in Fig. 1.

Referring to the drawings, which illustrate one form of my invention, A and 7 designate the moving elements of a watt-hour meter of conventional form, which meter is provided with a registering mechanism that has been omitted from the drawings, as it forms no part of my present invention. In practice I prefer to combine the recorder with a watt-hour meter in such a manner that they form a single instrument, thus enabling energy and interval demand readings to be made from one and the same instrument. My improved recorder comprises a chart B, a recording device C that is normally out of contact with or spaced away from the chart B, a mechanism for causing said recording device to move from zero position over the chart B a distance proportional to the travel or number of revolutions of the moving element A of the watt-hour meter during an interval of fixed duration, for example, a demand interval of fifteen minutes, and means for causing said recording device to engage the chart at the termination of each demand interval so as to produce a record which is proportional to the number of kilowatt hours passed through the watt-hour meter during said demand interval, the recorder being so constructed that the recording device C will be returned to zero immediately after it has been disengaged from the chart so that it will be in readiness to act, or, in other words, move over the chart during the succeeding demand interval. In the form of my invention herein shown the chart B is formed by a strip of paper or other suitable material that is moved continuously at a fixed rate per hour between the recording device C and a platen or stationary member 1 that forms a backing or support for the chart B when said recording device is moved into engagement with said chart, the chart B being provided with a plurality of parallel, vertical lines $x$ that represent kilowatts of average flow, kilowatt hours, or any other suitable term, and a plurality of horizontally-disposed, parallel lines $y$ that represent demand intervals. If desired, an inked ribbon or strip of carbon paper $z$ can be arranged between the recording device and the chart, as shown in Fig. 2. The chart B is unwound from a supply roll 3 by means of a feeding device 4 which may consist of a roller secured to a shaft 5 that is driven by a clock mechanism 2 of any suitable type which is arranged in a casing 6, as indicated by broken lines in Fig. 1. The recording device C of the recorder herein shown is operated directly by the watt-hour meter by means of a shaft 10 connected to the moving element A of said watt-hour meter by means of a worm 8 that meshes with a gear 9 on the shaft 10 to which the recording device C is frictionally connected. In meter parlance the shaft 7 and the disk A together constitute the "moving element" of the meter. The recording device C can be formed in various ways without departing from the spirit of my invention, but I prefer to use a recording device that consists of a relatively long arm c which is provided at its lower end with a suitable marking, impression or perforating device c', as shown in Fig. 2. Said arm C is arranged at right angles to the shaft 10 so that it will move in a plane parallel to the face of the chart under the influence of the watt-hour meter, and it is either hinged intermediate its ends, or is formed from material that is more or less resilient, so that the device c' on the lower end of said arm can be moved into engagement with the chart by means of an operating device hereinafter described which strikes the arm c intermittently. It is desirable to make the arm c of the recording device as light as possible, so that no matter what its position is on the chart, the torque required to move it over the chart will be too small to appreciably affect the accuracy of the watt-hour meter. The arm c of the recording device is provided at its upper end with a hub or collar 11 that is loosely mounted on the shaft 10, said collar being arranged between a rigidly mounted collar or abutment 12 on the shaft 10 and a movable collar 13 on said shaft that is normally under the influence of a spring 14 which is interposed between said movable collar 13 and a rigidly mounted collar or abutment 15 on the shaft 10, as shown more clearly in Fig. 2. The shaft 10 is preferably mounted between jeweled bearings (not shown) so that the recorder will not impose sufficient load on the watt-hour meter to impair the accuracy of same, and if desired, one side of the collar 11 on the upper end of the arm of the recording device C, and also the collar 12 can be faced with friction material 11ª, or can be serrated so as to produce a good driving connection between the recording device and the shaft 10 that moves same over the chart.

The operating device previously referred to that causes the recording device to engage the chart B intermittently preferably consists of a pivotally mounted, yoke-shaped member D arranged in proximity to the recording device C, and a cam E that moves said yoke-shaped device D into engagement with the arm c of the recording device C and forces the lower end of said arm toward the chart B at the end of each demand interval. The yoke-shaped member D is rigidly connected to a rock shaft 16 that is supported in suitable bearings (not shown), and said rock shaft is provided with an arm 17 that lies under the cam E, as shown in Fig. 2. Various means may be employed for operating the cam E, but I prefer to secure said cam to a shaft 18 which is rotated intermittently by a mechanism 19 arranged inside of the housing 6 and constructed in such a manner that it will impart a quick revolution to the cam E at the termination of each time interval, the time that the nose of the cam is in contact with the lever 22 being sufficient for the arm c to return to zero position when swinging back from the highest position it is required to assume. Said mechanism 19 can be constructed in much the same manner as the striking mechanism of a clock, and it can comprise a driving spring separate and distinct from the driving spring of the clock mechanism 2 that is used to feed the chart. The mechanism 19 will, of course, be so constructed and combined with the clock mechanism 2 that the cam E will make a quick revolution at the termination of each demand interval. A spring 20 or other suitable means can be used for returning the yoke-shaped member D to its normal position in engagement with a stop 21, as shown in Fig. 2. After the recording device C has been actuated by the member D so as to produce a mark, perforation or impression on the chart, said recording device is immediately thereafter disengaged from the driving elements 12 and 13 on the operating shaft 10 and returned to its zero position which is at the left hand side of the chart B, looking at Fig. 1. One means that can be used for disengaging the recording device from said friction elements consists of a lever 22 arranged in position to be acted on by the cam E and provided at its upper end with a bifurcated portion whose arms 22ª are positioned in an annular groove 23 in the collar 13. When the cam E rotates in the direction of the arrow in Fig. 2 it will first actuate the yoke-shaped member D and force the recording device C toward the chart, and thereafter said cam will act upon the lower end of the lever 22 and move said lever in a direction to force the collar 13 longitudinally of the shaft 10 away from the rigidly mounted collar 12 on said shaft, thus releasing the collar or hub 11 on the upper end of the arm c of the recording device. The recording device C will immediately thereafter swing back to zero position under the influence of a spring or weight 24 mounted on an arm 25 on the collar 11. As soon as the high point on the cam E passes out of engagement with the lever 22, the collar 13 will move to the right, looking at Fig. 2, so as to cause the hub 11 on the upper end of the arm of the recording device to be frictionally connected to the shaft 10. Normally, the upper end of the forked lever 22 will not be in contact with the grooved collar 13.

When the recorder is in operation, the arm of the recording device C moves in a plane parallel to the surface of the chart, the marking, printing or perforating device on the lower end of said arm being out of contact with the chart during the movement of the recording device over the chart. At the termination of each demand interval, for instance, every fifteen minutes, the recording device is depressed against the chart for a brief interval, leaving an indentation, perforation or mark on the chart that indicates the integrated or average demand for that particular interval. Said recording device then returns to zero and immediately thereafter it is reëngaged with the moving element of the watt-hour meter.

In view of the fact that the contact between the recording device and the chart need exist for only a small fraction of a second, it is immaterial whether the recording device be mechanically connected to the moving parts of the watt-hour meter at that instant. Furthermore, as the force which moves the recording device against the chart at the termination of each demand interval acts at approximately right angles to the plane through which the chart moves, the arm of the recording device can be so constructed as to easily flex in any direction without impairing the accuracy of the record made on the chart and without liability of imposing any retarding effect on the watt-hour meter during the brief interval of contact.

When my improved recorder is in operation the sequence of the various functions is as follows:

(a) At the termination of each predetermined time interval the recording device C is forced against the chart for the briefest possible interval, the yoke-shaped member D which moves said recording device against the chart being immediately withdrawn so that it clears the recording device when the latter springs away from the chart.

(b) Instantly thereafter the arm of the recording device C is disengaged from the driving elements on the shaft 10 that is operatively connected to the watt-hour meter, allowing the arm of the recording device to swing back to zero under the influence of the weight 24 or other means employed for returning the recording device to starting position.

(c) Instantly thereafter the arm of the recording device is reëngaged with the driving elements on the shaft 10, so that the recording device is in readiness for its next trip across the chart during the next succeeding time interval.

I am aware of the fact that it is old in instruments for the measurement of instantaneous values such as voltmeters, ammeters, thermometers, etc., to employ a stylus which is normally out of contact with a moving chart and provide means for bringing the stylus into contact with the chart at regular intervals, but my improved recorder is distinguished from such instruments, in that it comprises a freely swinging recording device that moves in a plane approximately parallel to the chart a distance proportional to the total movement or number of revolutions of the movable element of the watt-hour meter or instrument with which the recorder is used during an interval of fixed duration, means for causing said recording device to engage the chart at the termination of each fixed interval, means for immediately thereafter disengaging the recording device from the mechanism that moves same over the chart, so as to allow said recording device to return to zero or starting position, and means for immediately thereafter reengaging the recording device with said mechanism so that the functions previously described will be repeated during the next succeeding time interval.

While the recorder herein illustrated is intended to be used primarily in conjunction with a moving or traveling chart, it is obvious that a stationary chart could be employed, if it were not desired to secure a record of the time of occurrence of any particular interval demand or demands. If a stationary chart were used, it would be removably mounted in a holder or other supporting element so that it could be taken out at the end of each month or at the end of any other fiscal period and a new chart substituted for same. Such a recorder would possess the advantage over indicating maximum demand instruments that the man sent out to read the instrument would be able to bring back to the office of the company controlling or operating the instrument a permanent record of the maximum interval demand.

Having thus described my invention, what I claim, and desire to secure by Letters Patent, is:

1. An interval maximum demand recorder, comprising a chart, a recording device that is normally spaced away from or out of contact with said chart, means operated mechanically by the metering instrument with which the recorder is used for directly actuating one of said elements so as to cause it to move relatively to the other element a distance proportional to the movement of the movable element of the meter or instrument with which the recorder is used during a time interval of fixed duration, a mechanically operated means for causing the recording device to act on the chart at the termination of said demand interval, and means for causing said recording device to be thereafter positioned at zero on the chart so that it will be in readiness to act during the succeeding demand interval.

2. An interval maximum demand recorder, comprising a chart, a recording device that is normally spaced away from or out of engagement with said chart, an operating mechanism for said recording device comprising a movable part that is mechanically connected with the meter or instrument with which the recorder is used and which directly moves the recording device into various positions during intervals of fixed duration according to the quantity of current or medium passed through the meter or instrument during each of said intervals, and a mechanically-operated means for causing said recording device to act on the chart at the termination of each interval so as to make a permanent record that is proportional to the quantity of current or medium passed through said meter or instrument.

3. An interval maximum demand recorder, comprising a chart, a recording device that is normally spaced away from or out of contact with said chart, a mechanical means operated by the meter or instrument with which the recorder is used for imparting movement directly to the recording device so as to cause said recording device to move away from zero position a distance that is proportional to the quantity of the current or medium measured by the meter or instrument during a period of fixed duration, means for returning said recording device to zero position, and a mechanically-operated means for causing said recording device to engage said chart at the termination of each demand period and prior to the return of the recording device to zero so as to produce a record which shows the average demands made on the system during the various demand periods.

4. An interval maximum demand recorder, comprising a chart, a recording device that is normally spaced away from or out of engagement with said chart, a watt-hour meter or other metering instrument, a mechanism operated directly by said meter or instrument for imparting movement to the recording device so as to cause said recording device to move over the chart a distance proportional to the quantity of medium passed through the meter or instrument during an interval of fixed duration, a mechanically-operated means for causing said recording device to act on said chart at the termination of each demand interval, and means for immediately thereafter restoring said recording device to zero position so that it will be in readiness to act during the succeeding demand interval.

5. An interval maximum demand recorder, comprising a chart, a recording device that is normally spaced away from or out of engagement with said chart, a mechanism operated by the meter or instrument with which the recorder is used and comprising a movable part that directly actuates the recording device and causes said recording device to move over the chart variable distances during successive intervals each of fixed duration, means for returning said recording device to zero position, and a mechanically-operated means for causing said recording device to act on the chart at the termination of said interval so as to make a record on the chart that represents the distance which the recording device moved during the demand interval.

6. An interval maximum demand recorder, comprising a chart, a recording device that is normally spaced away from or out of engagement with said chart, said recording device having a zero position, a watt-hour meter or other metering instrument, means operated by said meter for directly actuating the recording device so as to cause said recording device to move over the chart during an interval of fixed duration a distance proportional to the movement of the movable element of the meter during said interval, means for causing said device to return to zero position at the termination of said interval, and a mechanically operated means for causing said recording device to act on the chart at the termination of said interval.

7. An interval maximum demand recorder, comprising a chart, a recording device that is normally spaced away from or out of engagement with said chart, mechanism operated directly by the meter or instrument with which the recorder is used and comprising a part which directly moves said recording device in a plane parallel to said chart a distance proportional to the movement or number of revolutions of the movable element of said meter or instrument during an interval of fixed duration, and a mechanically operated means for causing said recording device to act on the chart at the termination of said interval, said mechanism being so constructed that the recording device is returned to zero position prior to or at the beginning of each demand interval.

8. An interval maximum demand recorder, comprising a chart, a recording device that is normally spaced away from or out of engagement with said chart, an operating mechanism for said device frictionally connected to same for moving said device a variable distance during an interval of fixed duration, means for causing said recording device to act on said chart at the termination of said interval, and means for disengaging said device from the mechanism that operates the same and for restoring said device to zero position at the termination of said interval.

9. An interval maximum demand recorder, comprising a chart, an oscillating recording device arranged to travel in a plane parallel to the face of said chart and normally spaced away from the same, an operating mechanism for said recording device that receives its movement from the meter or instrument with which the recorder is used and which moves said device over the chart a greater or lesser distance according to the quantity of the medium passed through said meter during an interval of fixed duration, a mechanically operated means for causing said recording device to act on the chart at the termination of said interval, and means for disengaging said recording device from said mechanism and causing said device to move in the opposite direction over said chart after it has acted upon said chart at the termination of said interval.

10. A maximum demand recorder, comprising a chart, an oscillating recording device arranged to travel over said chart from zero position, said device being normally spaced away from said chart, an operating shaft for said device operated directly by the meter or instrument with which the recorder is used, a driving connection between said device and shaft, a mechanically operated means for causing said recording device to act on said chart at the termination of a period of fixed duration, means for disengaging said device from said shaft, and means for thereafter returning said device to zero position.

11. A maximum demand recorder, comprising a chart, a recording device normally spaced away from said chart and adapted to be moved from zero position variable distances over said chart, an operating shaft for said device, a member for moving said devices into engagement with said chart, and an intermittently operated means for actuating said member and for disengaging said recording device from its operating shaft.

12. A maximum demand recorder, comprising a chart, an operating shaft operated mechanically by the meter or instrument with which the recorder is used, a recording device normally spaced away from said chart and provided with an arm that is mounted on said shaft, driving elements that serve to connect said arm to said shaft, a mechanically operated means for causing said recording device to act on said chart at the termination of an interval of fixed duration, means that acts immediately thereafter for rendering said driving elements inoperative so as to release said recording device, and means for restoring said recording device to zero position during the time said driving elements are inoperative.

13. A maximum demand recorder, comprising a chart, a recording device normally spaced away from or out of contact with said chart and provided with an oscillating arm that swings in a plane parallel to said chart, an operating shaft for said device governed by the meter or instrument with which the recorder is used, a spring-pressed driving element on said shaft that coöperates with said arm to connect it to said shaft, an actuating member for moving said arm so as to force said recording device into engagement with said chart, and an intermittently-operating means which first imparts movement to said actuating member and thereafter renders said driving element inoperative so as to release the arm of said recording device and permit said device to return to zero position.

14. A maximum demand recorder, comprising a chart, an operating shaft governed by the meter or instrument with which the recorder is used, a recording device that is normally spaced away from said chart and which is provided with an arm that is loosely mounted on said shaft, a spring-pressed driving element on said shaft that serves to connect said arm and shaft together, a lever combined with said driving element, an actuating member that is adapted to engage said arm and move said recording device toward said chart, and an intermittently-operating cam arranged so that it will first operate said actuating member and thereafter move said lever in a direction to render said driving element inoperative.

15. An interval maximum demand recorder, comprising a chart, means for moving said chart, a recording device normally spaced away from or out of contact with said chart and arranged to move in a direction substantially at right angles to the direction of travel of the chart, means operated mechanically by the metering instrument with which the recorder is used for moving said recording device a variable distance during each of a number of successive intervals of fixed duration, a mechanically-operated means for causing said recording device to act on the chart at the termination of each interval, and means for restoring said recording device to zero position immediately after it has acted on said chart.

16. An interval maximum demand recorder, comprising a traveling chart, a mechanism for governing the speed or rate of movement of said chart, a recording device that is normally spaced away from or out of contact with said chart and provided with an arm that swings in a plane parallel to the chart, a mechanically-operated mechanism, actuated directly by the instrument with which the recorder is used, for moving said arm a distance proportional to the quantity of the medium passed by the metering instrument during an interval of fixed duration, an actuating member for causing said recording device to act on the chart, an intermittently operating mechanical means that positively moves said actuating member at the termination of said interval and thereafter releases the arm of the recording device from said operating mechanism, and means for immediately thereafter restoring said recording device to zero position.

GEORGE D. POGUE.